United States Patent
Zhang et al.

(10) Patent No.: US 12,104,921 B2
(45) Date of Patent: Oct. 1, 2024

(54) ADVANCED DATA FUSION STRUCTURE FOR MAP AND SENSORS

(71) Applicant: HERE Global B.V., Eindhoven (NL)

(72) Inventors: Zhenhua Zhang, Chicago, IL (US); Sharleen Sun, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 127 days.

(21) Appl. No.: 17/481,698

(22) Filed: Sep. 22, 2021

(65) Prior Publication Data

US 2023/0098688 A1   Mar. 30, 2023

(51) Int. Cl.
| | |
|---|---|
| *G01C 21/00* | (2006.01) |
| *B60W 30/14* | (2006.01) |
| *B60W 50/06* | (2006.01) |
| *B60W 60/00* | (2020.01) |
| *G01C 21/28* | (2006.01) |

(52) U.S. Cl.
CPC ....... *G01C 21/3815* (2020.08); *B60W 30/143* (2013.01); *B60W 50/06* (2013.01); *B60W 60/001* (2020.02); *G01C 21/28* (2013.01); *G01C 21/3811* (2020.08); *B60W 2552/00* (2020.02); *B60W 2555/60* (2020.02)

(58) Field of Classification Search
None
See application file for complete search history.

(56) References Cited

U.S. PATENT DOCUMENTS

| | | |
|---|---|---|
| 10,551,207 B2 | 2/2020 | Bigio et al. |
| 10,670,725 B2 | 6/2020 | Tisdale et al. |
| 10,750,557 B1 * | 8/2020 | Kim .............. H04W 76/14 |
| 2015/0127227 A1 * | 5/2015 | Strolz ............ B60Q 1/085 701/49 |
| 2020/0050973 A1 * | 2/2020 | Stenneth ......... G01C 21/3815 |

FOREIGN PATENT DOCUMENTS

| | | |
|---|---|---|
| CN | 103954275 A | 7/2014 |
| CN | 110544376 A | 12/2019 |

OTHER PUBLICATIONS

Zhenhua Zhang, Autonomous Vehicle Application for improving Traffic Sign Learning near Ramps, Jul. 2020, Transportation Research Record, vol. 2674(10), pp. 158-166 (Year: 2020).*

Obradovic, Dragan, Henning Lenz, and Markus Schupfner. "Fusion of Map and Sensor Data in a Modern Car Navigation System." Journal of VLSI Signal Processing Systems for Signal, Image and Video Technology 45.1. Jun. 2005. (pp. 1-12).

* cited by examiner

*Primary Examiner* — Hongye Liang
(74) *Attorney, Agent, or Firm* — Lempia Summerfield Katz LLC

(57) ABSTRACT

System and methods for separating the computation of map feature derivation from the traditional computing pipeline. One or more mapping variables for a sensitive location on a roadway are calculated ahead of time using mapping data derived from previously identified map feature data. When a real time request for processing near the sensitive location is received, the mapping system calculates one or more classification variables for the sensitive location using sensor data included in the request and the previously calculated mapping variables. The classification variables are input into a model configured to output a classification for one or more location features at the sensitive location. The classification is then provided in response to the request.

12 Claims, 12 Drawing Sheets

ADVANCED DATA FUSION STRUCTURE
FOR MAP AND SENSORS

FIELD

The following disclosure relates to navigation devices or services.

BACKGROUND

Traffic sign classification is the process of automatically recognizing traffic signs along the road, including speed limit signs, yield signs, merge signs, among other. Traffic sign recognition (TSR) and classification is an important feature for self-driving or autonomous vehicles. Self-driving cars need traffic sign recognition in order to properly parse and understand the roadway. Similarly, "driver alert" systems inside cars need to understand the roadway around them to help aid and protect drivers.

A visual-based TSR system may be implemented on a vehicle with an aim of detecting and recognizing upcoming traffic signs. Vision-based traffic sign recognition plays an essential role in intelligent transport systems such as in automated driving systems and advanced driver assistance systems. Traffic sign recognition systems typically include two stages: traffic sign detection and traffic sign recognition. Traffic sign detection takes images captured from a camera to locate exactly traffic sign regions, while traffic sign recognition classifies each traffic sign into a corresponding class. Detected traffic signs from a detection stage are utilized as inputs for a recognition stage. Many approaches have been proposed to detect traffic signs. Traditional methods may include using features such as color, texture, edge, and other low-level features to detect traffic sign in an image captured by the vehicle. In a driving environment, due to the diversity of the traffic sign appearance, the occlusion of traffic sign by other objects, and the effect of lighting conditions, traffic sign detection and recognition may exhibit poor performance.

One method to increase the accuracy of traffic sign recognition systems is to combine the sensor data (e.g., from the camera) with digital map data that has been previously collected. Each time there is a sensor sign detection, the navigation application leverages stored map features to generate the derived features, and further implement the models to classify the signs. This process, while increasing the accuracy of traffic sign recognition and improving the ability of autonomous vehicles, is computationally expensive and potentially slow.

SUMMARY

In an embodiment, a method is provided for advanced data fusion in a mapping system, the method comprising: calculating, by the mapping system, one or more mapping variables for a location on a roadway using digital map data stored in a geographic database; receiving, by the mapping system subsequent to calculating the one or more mapping variables, a request for sensor data processing of a traffic sign near the location, the request including one or more sensor variables; calculating, by the mapping system, one or more variables for the location using the one or more sensor variables and the one or more mapping variables; inputting, by the mapping system, the one or more variables into a model configured to output a classification for the traffic sign near the location; and providing, by the mapping system, the classification in response to the request.

In an embodiment, a system is provided for advanced data fusion, the system comprising a transceiver, a memory, and a processor. The transceiver is configured to receive a request from a mobile device for sensor data processing near a location, the request including one or more sensor variables. The memory is configured to store digital mapping data. The processor is configured to calculate, prior to receiving the request, one or more mapping variables for the location using the digital mapping data, calculate one or more classification variables for the location using the one or more sensor variables and the one or more mapping variables, and input the one or more classification variables into a model configured to output a classification for a feature near the location. The transceiver is further configured to transmit the classification to the mobile device.

In an embodiment, a method is provided that comprises acquiring, by a vehicle, sensor data for a traffic sign at an upcoming location; generating and transmitting, by the vehicle, a request for sensor data processing by a mapping system, the request including the sensor data; receiving, by the vehicle, a classification for the traffic sign, the classification generated by the mapping system using the sensor data and pre-processed digital map data; and performing, by the vehicle, an action in response to the classified traffic sign.

BRIEF DESCRIPTION OF THE DRAWINGS

Exemplary embodiments of the present invention are described herein with reference to the following drawings.

DETAILED DESCRIPTION

Figure 1:
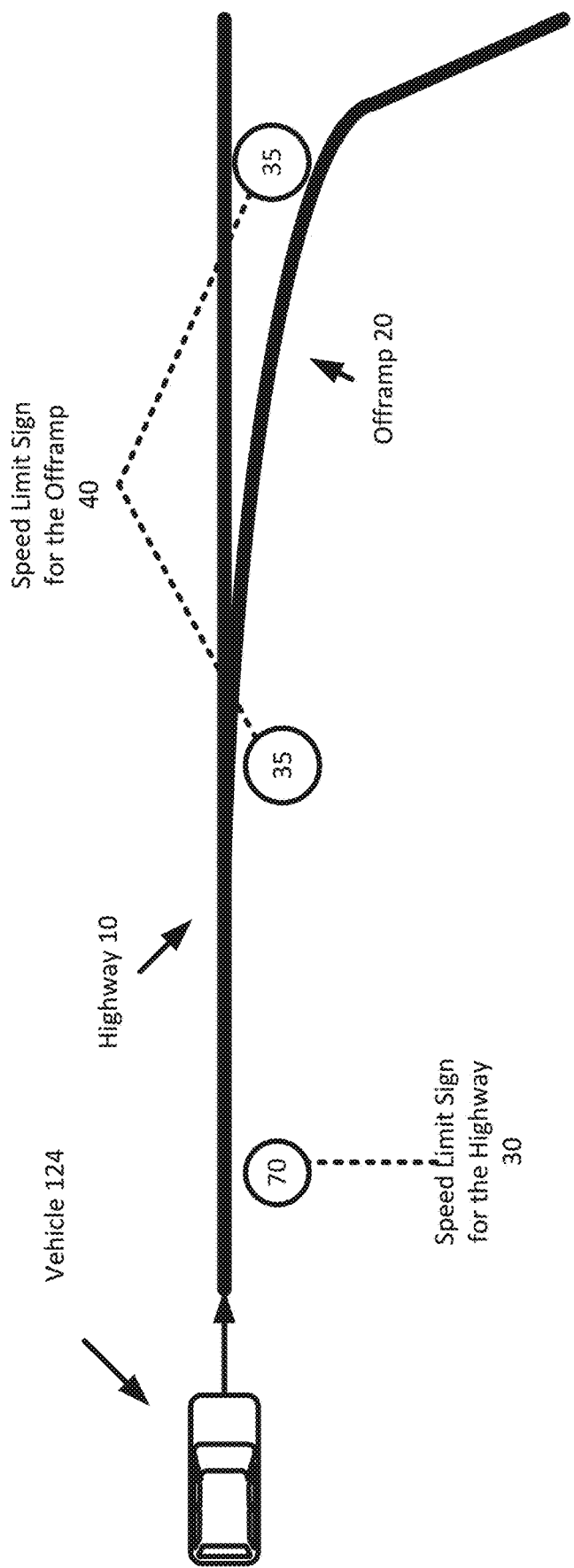
FIG. 1 depicts an example scenario where a traffic recognition system may fail.

Embodiments provide systems and methods for separating the computation of map feature derivation from the traditional computing pipeline. One or more mapping variables for a sensitive location on a roadway are calculated ahead of time using mapping data derived from previously identified map feature data. When a real time request for processing near the sensitive location is received, the mapping system calculates one or more classification variables for the sensitive location using sensor data included in the request and the previously calculated mapping variables. The classification variables are input into a model configured to output a classification for one or more location features at the sensitive location. The classification is then provided in response to the request.

It is difficult for drivers as well as autonomous cars to identify all the traffic signs on their path. Chances of missing out on crucial signs that may lead to fatal accidents cannot be neglected. To assists drivers and autonomous vehicles to overcome this problem camera-based TSR systems are used as a part of advanced driver assistance systems (ADAS) and autonomous vehicles. TSR systems typically include a camera that is front facing with a wide field of view covering the entire road for any relevant signage. TSR detects and identifies the signage with one or more algorithms. Typically, these algorithms take a machine learning approach rather than a classic image processing technique, which helps the system to identify and classify a diverse set of signs. TSR is necessary for autonomous vehicles as TSR as it allows vehicles to understand the roadway and rules and/or allows drivers to concentrate on the traffic in complicated situations. As an example, TSR helps vehicles to keep to the speed limit by identifying posted speed limits.

The systems and methods described herein may be applicable to vehicular systems in general, but more specifically to systems that support fully highly assisted, autonomous, or semi-autonomous vehicles. TSR allows a vehicle to better understand its' environment and thus provide additional services. The term autonomous vehicle refers to a self-driving or driverless mode in which no passengers are required to be on board to operate the vehicle. There are five typical levels of autonomous driving. For level 1, individual vehicle controls are automated, such as electronic stability control or automatic braking. For level 2 at least two controls can be automated in unison, such as adaptive cruise control in combination with lane-keeping. For level 3, the driver can fully cede control of all safety-critical functions in certain conditions. The car senses when conditions require the driver to retake control and provides a "sufficiently comfortable transition time" for the driver to do so. For level 4, the vehicle performs all safety-critical functions for the entire trip, with the driver not expected to control the vehicle at any time. For level 5, the vehicle includes humans only as passengers, no human interaction is needed or possible. Vehicles classified under Levels 4 and 5 are considered highly and fully autonomous respectively as they can engage in all the driving tasks without human intervention. An autonomous vehicle may also be referred to as a robot vehicle or an automated vehicle. As defined, an autonomous vehicle may include passengers, but no driver is necessary. The autonomous vehicles may park themselves or move cargo or passengers between locations without a human operator. Autonomous vehicles may include multiple modes and transition between the modes. Autonomous vehicles above level 3 must use TSR in order to operate safely on the roadway.

Vehicles using TSR typically perform at least some classification of signs locally or on-board the vehicle. A camera or other image generating device captures an image of a sign. The image or data is run through a machine learned classifier or model to detect the existence of the sign. The model may also identify the type and/or attributes of the sign. In addition to detecting and the sign, the vehicle must also properly identify its location and purpose. Determining a location of a sign may be performed using the location of the vehicle and either an image or range finding apparatus such as RADAR or LIDAR. However, there may still be some errors in the application of TSR such as ramp signs, blue signs, and signs near complex road networks. In an example, a Full Self-Driving system could, for example confuse the Moon or other round yellow object for a yellow sign and prompt the car to perform a maneuver in response. In another example, signs may be accurately detected but applied on the wrong links in complex roadway configurations such as ramps, medians, traffic circles etc.

FIG. 1 depicts an example scenario where TSR may not be accurate. For instance, in FIG. 1, the TSR system of the vehicle 124 may properly detect and recognize a speed limit sign 30 on the highway 10 indicating that the speed limit is 70. There is no confusion here as the speed limit sign may only be applied to a particular road segment that is part of the highway 10. However, the TSR may have issues with the speed limit signs 40 for the offramp 20 that indicate a speed of 35 for the offramp 20. Part of the confusion may lie in the fact that the first offramp speed limit sign that the vehicle sees will be detected while the vehicle is still on the highway 10. The TSR may instruct the vehicle 124 to slow down even though the vehicle does not take the offramp 20 due to not being able to identify that the signs apply to the offramp 20 and not the highway 10. Consequently, there is an unexpected and uncomfortable speed reduction on the freeway.

Mapping systems have attempted to solve these issues by using HD maps or known feature data that has been previously collected to accurately classify, locate, or verify the detected sign. In the traditional computing pipeline, the sensor data from the vehicle and mapping data stored in the cloud are combined in real-time to generate values for variables that can be used to classify or verify the signage. In many situations, the sensor data may be sufficient to identify upcoming signage. However, in certain scenarios, for example the ramp problem described in FIG. 1, mapping data is required or useful for identifying or locating a sign or validating the sensor data.

Figure 2:
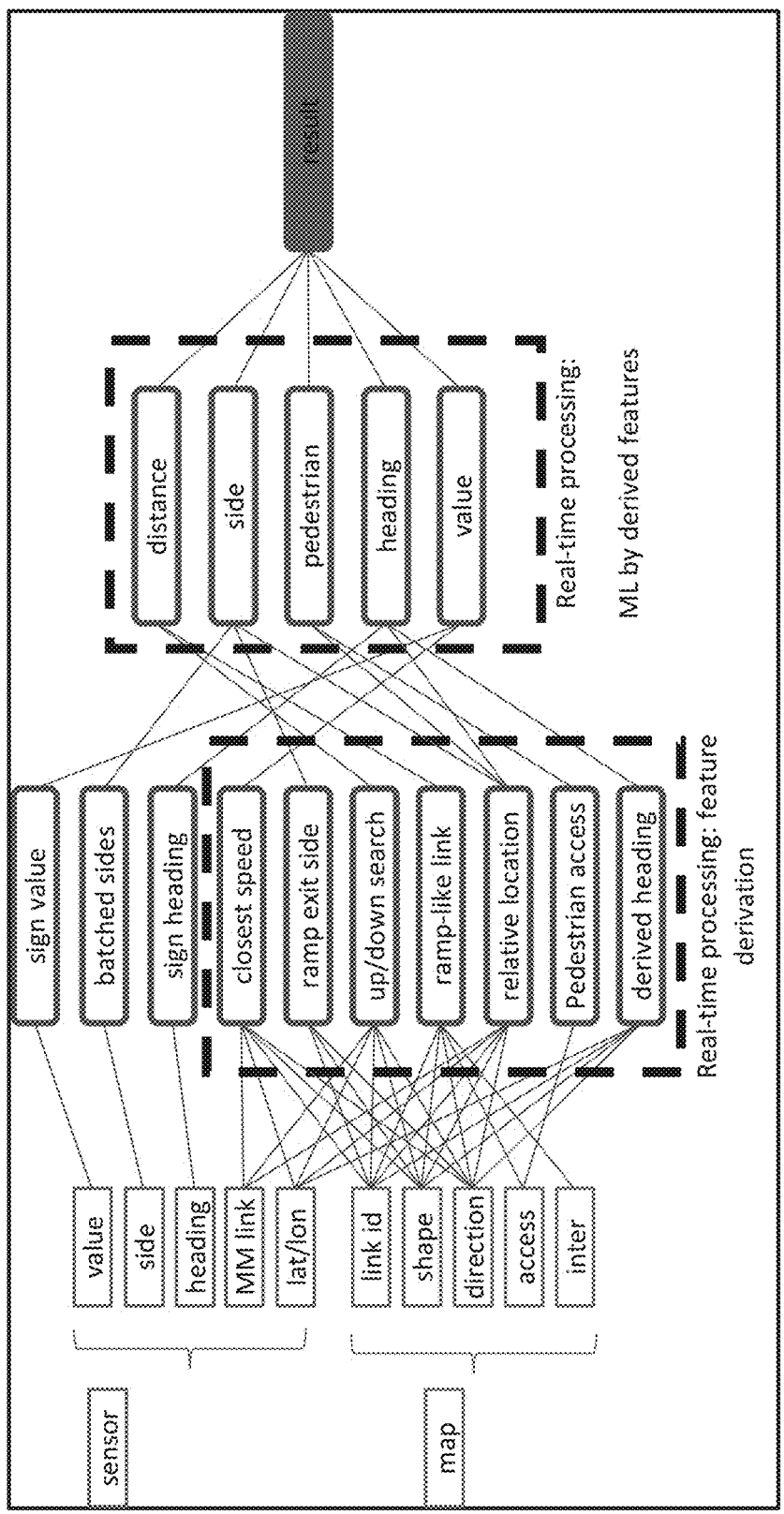
FIG. 2 depicts an example of real-time processing of map and sensor data.

When a vehicle detects/identifies a sign, the vehicle transmits a message to the mapping system that contains certain attributes, for example values for one or more variables such as Latitude/Longitude, heading, timestamp, detected road sign type, detected road sign value, side of the road, and/or the full vehicle path. The mapping system processes this data and mapping data from a geographic database using a model that outputs the sign classification and attributes (e.g., which road segment the sign should be applied to). FIG. 2 depicts the inputs/outputs and the data computing pipeline for classification of a sign in the scenario depicted in FIG. 1. Sensor data is acquired from a TSR system. Mapping data is provided by a geographic database. Features are derived in real time from both data sources. The features are input into a machine learning model to generate a result.

The addition of mapping data to the sensor data greatly increases the accuracy of TSR and allows autonomous vehicles to safely navigate the roadway. However, when the map data is fused with the sensor data in real-time data processing, the process results in costly heavy-loaded computation. As more and more autonomous vehicles and supported applications traverse the roadway, the sources of on-board sensors and the volume of the real-time sensor data are growing faster and faster. Determining how to efficiently utilize the data becomes a challenge such as efficiently identifying or correcting traffic signs near a ramp or other sensitive locations affecting autonomous driving applications. The current method of fusion of map data and sensor data is, as such, generating a drastic increase in processing and computing that must be performed in real time in response to the millions of requests received by the mapping system each day. In addition, the returned classifications/ sign attributes must be returned timely in order for the autonomous vehicle to make use of the improved accuracy. A delay could be harmful or even deadly.

Embodiments provide an improved processing pipeline that pre-calculates some values for certain scenarios and fuses the values with real-time sensor data to quickly and efficiently provide TSR classifications. For the purpose of efficiency, embodiments adapt the data fusion structure to the needs of current autonomous driving applications by providing quick and efficient classifications. Embodiments fuse the map data and sensor data to support the needs of autonomous driving applications, for example near sensitive locations such as a ramp, parallel roads, intersections, traffic circles etc.

Figure 3:
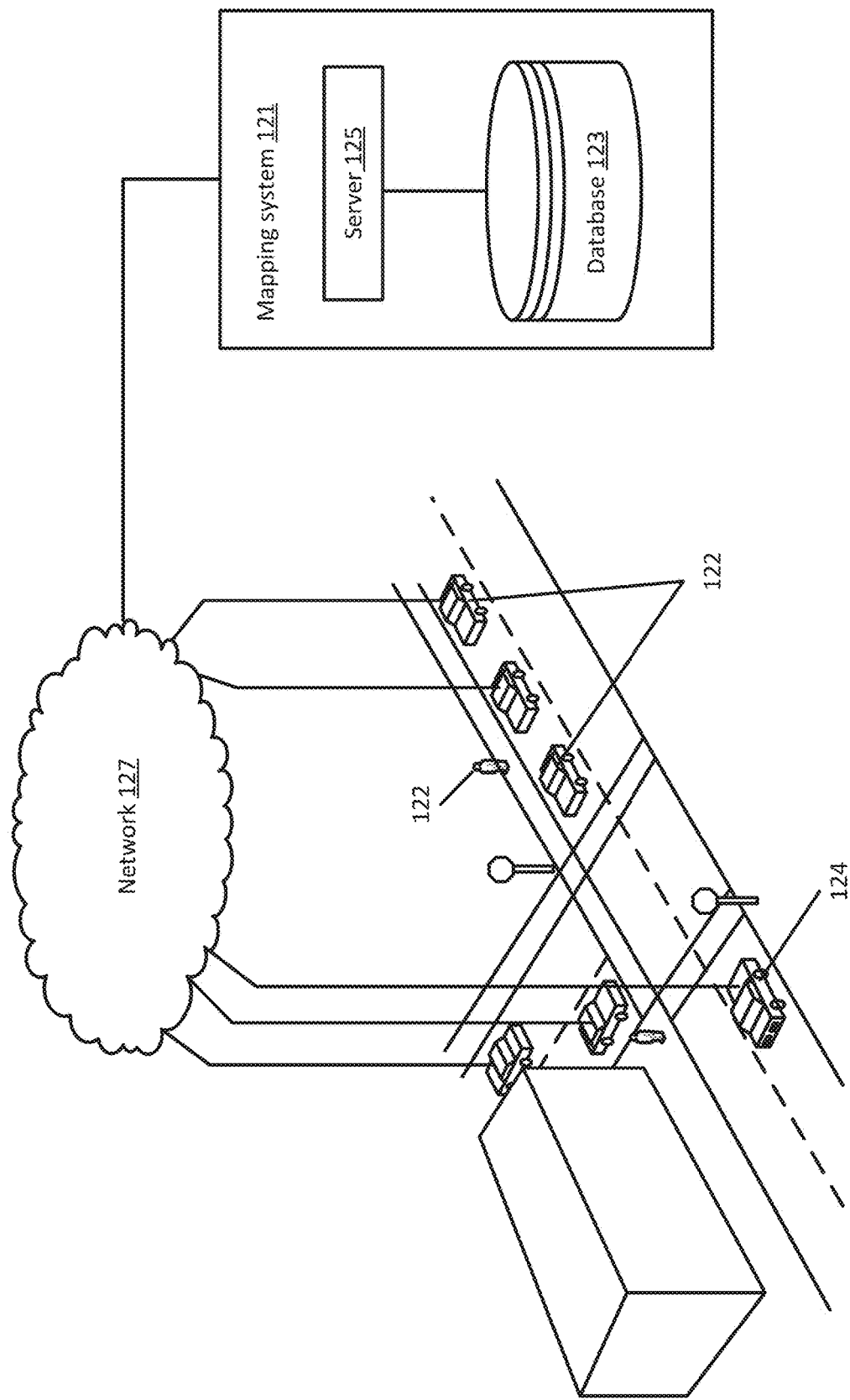
FIG. 3 depicts a system for advanced data fusion according to an embodiment.

FIG. 3 depicts a system for advanced data fusion for map and sensor data. The system includes at least a vehicle 124, one or more devices 122, a network 127, and a mapping system 121. The mapping system 121 may include a database 123 (also referred to as a geographic database 123 or map database) and a server 125. Additional, different, or fewer components may be included. In an embodiment, the one or more devices 122 collect data about the roadway over a period of time. The data is stored in the geographic database 123. The server 125 pre-processes the data in the geographic database 123 to generate data packages for certain scenarios. In real-time, a vehicle 124 generates and transmits a request including TSR observation data. The server 125 receives the request, fuses the TSR observation data and the pre-processed map data, inputs the fused data into a model that generates a classification result. The classification result is then transmitted back to the vehicle 124 which uses the classification result to generate an instruction or perform a maneuver.

The one or more devices 122 may also include probe devices 122, probe sensors, IoT (internet of things) devices 122, or other devices 122 such as personal navigation devices 122 or connected vehicles. The device 122 may be a mobile device or a tracking device that provides samples of data for the location of a person or vehicle 124. Vehicles 124 may include a device 122. The devices 122 may include mobile phones running specialized applications that collect location data as the devices 122 are carried by persons or things traveling a roadway system. The one or more devices 122 may include traditionally dumb or non-networked physical devices and everyday objects that have been embedded with one or more sensors or data collection applications and are configured to communicate over a network 127 such as the internet. The devices 122 may be configured as data sources that are configured to acquire roadway data over a period of time. These devices 122 may be remotely monitored and controlled. The devices 122 may be part of an environment in which each device 122 communicates with other related devices in the environment to automate tasks. The devices 122 may communicate sensor data to users, businesses, and, for example, the mapping system 121.

The one or more devices 122 collect data related to signage on the roadway such as the location and/or attributes. The signage data may include image data, location data, descriptions, or other attributes of a sign that is associated with the roadway. The traffic signage data may be collected by multiple devices that traverse a particular section or roadway. The traffic signage data may be aggregated by the mapping system 121 that is configured to add, remove, or adjust existing signage data stored in the geographic database 123. The traffic signage data may be collected over a period of time in different conditions. The devices 122 may be configured to provide probe reports to the mapping system 121 while traversing a roadway network. The probe reports may include signage data, for example, including sensor and feature data about a sign encountered on the roadway. The probe reports may include road segment data that describes the shape, length, type, etc. of each link/roadway segment. Each vehicle 124 and/or mobile device 122 may include position circuitry such as one or more processors or circuits for generating probe data. The probe data may be generated by receiving Global Navigation Satellite System (GNSS) signals and comparing the GNSS signals to a clock to determine the absolute or relative position of the vehicle and/or mobile device 122. The probe data may be generated using embedded sensors or other data relating to the environment of a vehicle or device 122. The probe data may include a geographic location such as a longitude value and a latitude value. In addition, the probe data may include a height or altitude. The probe data may be collected over time and include timestamps. In some examples, the probe data is collected at a predetermined time interval (e.g., every second, ever 100 milliseconds, or another interval). The probe data may also describe the speed, or velocity, of the mobile device 122. The speed may be determined from the changes of position over a time span calculated from the difference in respective timestamps. The time span may be the predetermined time interval, that is, sequential probe data may be used. In some examples, the probe data is collected in response to movement by the device 122 (i.e., the probe report's location information when the device 122 moves a threshold distance). The predetermined time interval for generating the probe data may be specified by an application or by the user. The interval for providing the probe data from the mobile device 122 to the server 125 may be may the same or different than the interval for collecting the probe data. The interval may be specified by an application or by the user.

The one or more devices 122 may be configured to acquire image data using one or more cameras embedded in or in communication with the one or more devices 122. The image data may be included with the signage data and may be transmitted to the mapping system 121 for storage in the geographic database 123 and processing by the server 125. The image data may include metadata, for example, attributes about an image, such as its height and width, in pixels. The metadata may describe the content of the image, the date and time of the image, etc.

The one or more devices 122 may communicate the signage data to the server 125 or mapping system 121. To communicate with the devices 122, systems or services, the mapping system 121 is connected to the network 127. The mapping system 121 may receive or transmit data through the network 127. The mapping system 121 may also transmit paths, routes, or traffic accident/traffic violation data through the network 127. The mapping system 121 may also be connected to an OEM cloud that may be used to provide mapping services to vehicles via the OEM cloud or directly by the mapping system 121 through the network 127. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMAX (Worldwide Interoperability for Microwave Access) network, DSRC (otherwise known as WAVE, ITS-G5, or 802.11p and future generations thereof), a 5G wireless network, or wireless short-range network such as Zigbee, Bluetooth Low Energy, Z-Wave, RFID and NFC. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols. The devices 122 may use Vehicle-to-vehicle (V2V) communication to wirelessly exchange information about their speed, location, heading, and roadway conditions with other vehicles, devices 122, or the mapping system 121. The devices 122 may use V2V communication to broadcast and receive omni-directional messages creating a 360-degree "awareness" of other vehicles in proximity of the vehicle. Vehicles equipped with appropriate software may use the messages from surrounding vehicles to determine potential threats or obstacles as the threats develop. The devices 122 may use a V2V communication system such as a Vehicular ad-hoc Network (VANET).

The mapping system 121 may include multiple servers 125, workstations, databases, and other machines connected together and maintained by a map developer. The mapping system 121 may be configured to acquire and process data relating to roadway or vehicle conditions. For example, the mapping system 121 may receive and input data such as vehicle data, user data, weather data, road condition data, road works data, traffic feeds, etc. The data may be historical, real-time, or predictive. The data may be stored in an HD map, in a location graph, or in the geographic database 123 for use in location-based services and navigation-based services. The mapping service may also provide information generated from attribute data included in the database 123.

The server(s) 125 may be a host for a website or web service such as a mapping service and/or a navigation service. The mapping service may provide standard maps or HD maps generated from the geographic data of the database 123, and the navigation service may generate routing or other directions from the geographic data of the database 123. The mapping service may also provide information generated from attribute data included in the database 123. The server 125 may also provide historical, future, recent or current traffic conditions for the links, segments, paths, or routes using historical, recent, or real-time collected data. The server 125 is configured to communicate with the devices 122 through the network 127. The server 125 is configured to receive a request from a device 122 for a route or maneuver instructions and generate one or more potential routes or instructions using data stored in the geographic database 123. The server 125 may also be configured to provide up to date information and maps to external geographic databases or mapping applications.

The server 125 is configured to collect TSR observation data from vehicles and digital map data. The TSR observation data are the traffic sign classification results of the on-board TSR systems in the running vehicles 124, for example, a speed limit sign. The digital map data include feature data about traffic signs stored in the geographic database 123 and based on previously collected data from the one or more devices 122.

The geographic database 123 is configured to store and provide information to and from at least the mapping system 121, server 125, and devices 122. The geographic database 123 may store and organize the acquired signage data received from the devices 122 and/or processed by the mapping system 121. The geographic database 123 may include one or more indexes of geographic data. The indexes may include various types of indexes that relate the different types of data to each other or that relate to other aspects of the data contained in the geographic database 123. The indexes may include, for example, data relating to points of interest or roadway features. The point of interest data may include point of interest records including, for example, a type (e.g., the type of point of interest, such as restaurant, fuel station, hotel, city hall, police station, historical marker, ATM, golf course, truck stop, vehicle chain-up stations etc.), location of the point of interest, a phone number, hours of operation, etc. The geographic database 123 provides data (e.g., digital map data) for the sign classification model. The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout the geographic region to observe features and/or record information about the roadway.

In an embodiment, the server 125 is configured to acquire sensor data from a vehicle 124 and provide classifications or instructions to a vehicle 124 such as an autonomous vehicle. The vehicle 124 is configured with a TSR system or application that is configured to acquire TSR observation data about upcoming signage. Examples of signs may include at least speed limit signs. TSR systems should be able to detect at least the local speed limit on a particular road. Depending on the manufacturer, more advanced systems may also be able to detect other traffic signs such as 'Stop', 'Yield', 'Give Way', 'Wrong Way' and 'No Entry' signs. The TSR system is configured to detect and track road signs and display the sign information in the vehicle. The TSR system may be configured to recognize the textual information of a traffic sign at over 95% accuracy. However, alone, TSR systems may not be ready for complex roadworks in certain situations such as ramp segments. In real-world applications as described in FIG. 1, when the vehicles are running on the highway, the vehicles 124 are at the risk of mis-detecting the traffic signs for the ramp, that becomes inaccurate feedback to the autonomous driving applications and could result in an unexpected speed reduction. In an embodiment, the TSR observation data is fused with mapping data by the server 125 to increase accuracy, particularly around areas such as on and off ramps. The increase in accuracy allows an autonomous vehicle to operate more efficiently and safely.

The term autonomous vehicle 124 may refer to a self-driving or driverless mode in which no passengers are required to be on board to operate the vehicle 124. An autonomous vehicle 124 may be referred to as a robot vehicle or an automated vehicle. The autonomous vehicle 124 may include passengers, but no driver is necessary. These autonomous vehicles 124 may park themselves or move cargo between locations without a human operator. Autonomous vehicles 124 may include multiple modes and transition between the modes. The autonomous vehicle 124 may steer, brake, or accelerate the vehicle 124 based on the position of the vehicle 124 in order, and may respond to lane marking indicators (lane marking type, lane marking intensity, lane marking color, lane marking offset, lane marking width, or other characteristics) received from geographic database 123 and the mapping system 121 and driving commands or navigation commands.

A highly assisted driving (HAD) vehicle may refer to a vehicle that does not completely replace the human operator. Instead, in a highly assisted driving mode, the vehicle may perform some driving functions and the human operator may perform some driving functions. Vehicles 124 may also be driven in a manual mode in which the human operator exercises a degree of control over the movement of the vehicle. The vehicles 124 may also include a completely driverless mode. Other levels of automation are possible. The HAD vehicle may control the vehicle through steering or braking in response to the on the position of the vehicle and may respond to lane marking indicators (lane marking type, lane marking intensity, lane marking color, lane marking offset, lane marking width, or other characteristics) received from geographic database 123 and the mapping system 121 and driving commands or navigation commands.

Similarly, ADAS vehicles 124 include one or more partially automated systems in which the vehicle alerts the driver. The features are designed to avoid collisions automatically. Features may include adaptive cruise control, automate braking, or steering adjustments to keep the driver in the correct lane. ADAS vehicles 124 may issue warnings for the driver based on the position of the vehicle or based on the lane marking indicators (lane marking type, lane marking intensity, lane marking color, lane marking offset, lane marking width, or other characteristics) received from geographic database 123 and the mapping system 121 and driving commands or navigation commands.

The devices 122 and/or vehicle 124 may include one or more distance data detection devices or sensors, such as a LiDAR or RADAR device. Radar sends out radio waves that detect objects and gauge their distance and speed in relation to the vehicle 124 in real time. Both short- and long-range radar sensors may be deployed all around the car and each one has their different functions. While short range (24 GHZ) radar applications enable blind spot monitoring, for example lane-keeping assistance, and parking aids, the roles of the long range (77 GHz) radar sensors include automatic distance control and brake assistance. Unlike camera sensors, radar systems may still function properly when identifying objects during fog or rain. The vehicle 124 may also be equipped with LiDAR. LiDAR sensors work similar to radar systems, with the difference being that LiDAR uses lasers instead of radio waves. Apart from measuring the distances to various objects on the road, the vehicle 124 may use LiDAR to create three-dimensional images of the detected objects and map the surroundings. The vehicle 124 may use LiDAR to create a full 360-degree map around the vehicle 124 rather than relying on a narrow field of view.

The distance data detection sensor may include a laser range finder that rotates a mirror directing a laser to the surroundings or vicinity of a vehicle on a roadway or another collection device on any type of pathway. The vehicle 124 may include a communication device and an environment sensor array for detecting and reporting the surroundings of the vehicle 124 to the mapping system 121 in order to, for example, generate a three-dimensional map. The vehicle 124 may include an integrated communication device coupled with an in-dash navigation system. The vehicle 124 may include an ad-hoc communication device such as a mobile device or smartphone in communication with a vehicle system. The communication device connects the vehicle 124 to a network 127 including at least the mapping system 121.

The device 122 and/or vehicle 124 may also use passive sensors, such as vision-based techniques with cameras or other imaging sensors to understand its position and provide information to the mapping system 121 to analyze and identify complex driving locations. Vision-based techniques are used to acquire information about signs, obstacles, other vehicles, and the geometry of the roadway and surrounding environment. Video data, image data, or other sensor data may be collected and processed to identify information about a particular location. Image recognition methods or classifiers such as neural networks may be used to identify features or obstacles for an area such as an upcoming sign. The image data may be used by the mapping system 121 along with mapping data stored in the geographic database 123 to understand the location of the vehicle 124 and what driving decisions should be made.

During operation, the vehicle 124 is configured to acquire sensor data (image data, ranging data, etc.) about an upcoming sign, detect the sign using, for example, a TSR application, and transmit a request to the mapping system 121 for classification. The mapping system 121 fuses the real-time sensor data with previously calculated digital map data and inputs the data into a classification model. The classification model returns a classification for the sign. The mapping system 121 transmits the classification and any relevant associated attributes (for example that are stored in the geographic database 123) to the vehicle 124. The vehicle 124 receives the classification and generates an instruction for one or more systems embedded in the vehicle 124 to perform. As an example, for a speed limit sign, the vehicle may adjust the speed of the vehicle in response to the classification of an upcoming sign.

Figure 4:
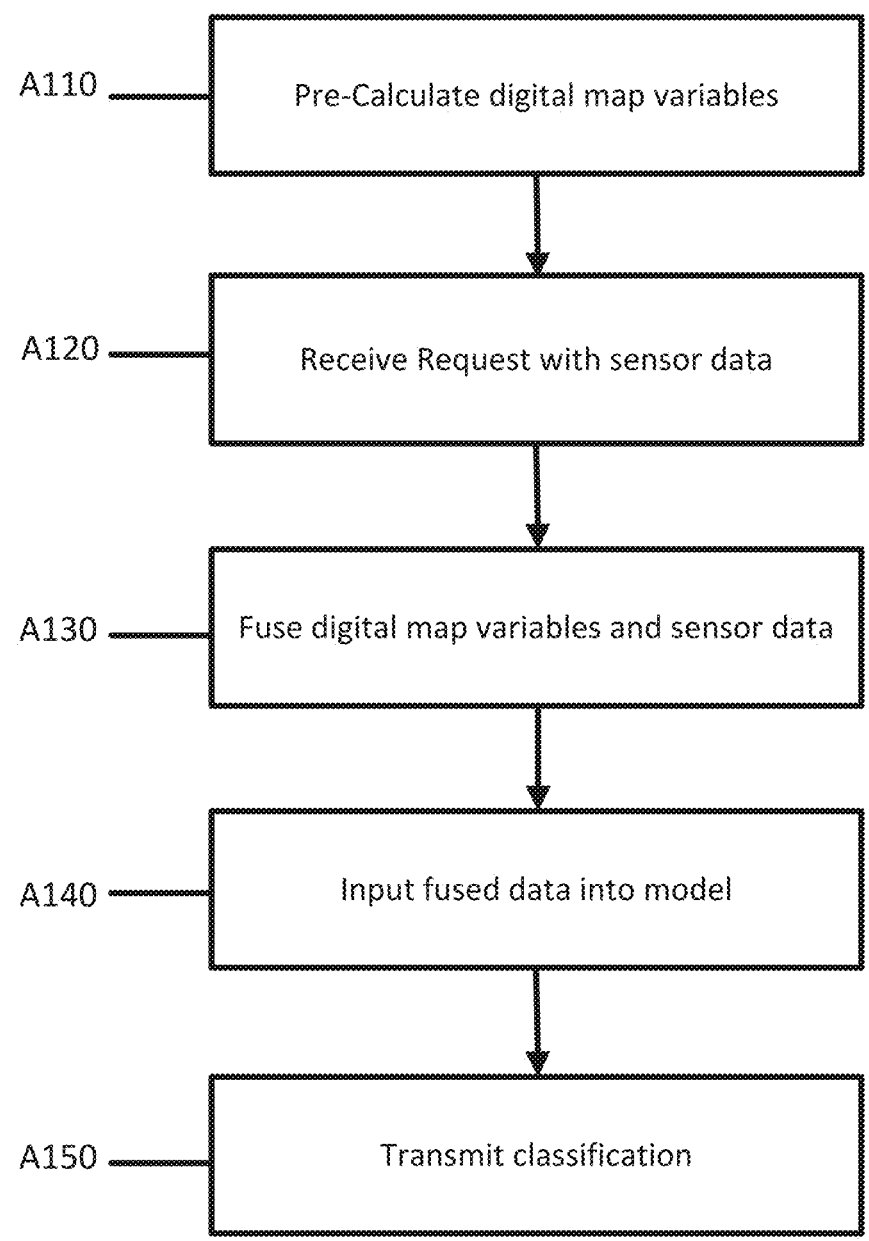
FIG. 4 depicts an example workflow for advanced data fusion according to an embodiment.

FIG. 4 depicts a workflow for advanced data fusion for mapping and sensors. As presented in the following sections, the acts may be performed using any combination of the components indicated in FIG. 3, 6, or 10. The following acts may be performed by the server 125, the device 122, the vehicle 124, the mapping system 121, or a combination thereof. Additional, different, or fewer acts may be provided. The acts are performed in the order shown or other orders. The acts may also be repeated. Certain acts may be skipped. The following uses a ramp sign classification as an example of advanced data fusion of map and sensor data. Alternative signage classification may be generated by the mapping system 121, for example in other sensitive locations where typical TSR is lacking. The method and system described may be applicable to any data processing system that would benefit from pre-processing or offline processing of map data in advance of receiving sensor data from a vehicle. The following example also describe the application of the advanced processing to an autonomous vehicle but may also be applicable for any type of ADAS that uses TSR.

At act A110, the mapping system 121 calculates one or more mapping variables for a sensitive location on a roadway using mapping data purely derived from the existing map features. The one or more mapping variables are calculated offline, in other words, not in real time when a request is received, for example, an hour, a day, a week, or even longer prior to receiving a request. The mapping variables may be recalculated as computational power becomes available. In an embodiment, the mapping system 121 may query locations stored in the geographic database 123 to determine sensitive locations such as ramps, complex interchanges, roundabouts, etc. In an example, for sensitive locations such as ramps where a typical TSR system may be confused, the mapping system 121 may create a new package or group of data that includes a set of preprocessed values of digital map data. Different variables or attributes may be calculated for different scenarios. In an example of a ramp link, the digital mapping data may include, for example, the link id (the unique id for the link), shape (a set of shape locations for the links excluding start and end locations), direction (of travel), the access, and inter. For a different type of sensitive location, different types or attributes may be calculated.

Table 1 below describes the feature ramp link and the supporting attributes that may be calculated offline/preprocessed/ahead of time. The offline processed variables may include Ramp ID which is used to identify the links in the same group, the LINK_ID, the position including Up main/Down main/Ramp, the Start offset which is calculated from nearby links and relative position to ramp, the End offset which is calculated from nearby links and relative position to ramp, the Link length which is calculated from topology, the main link speed which is used to identify the map speed feature, the main link map speed of downstream connecting link1 which is used to identify the map speed feature, and pedestrian.

| Feature | Support attribute | Comment |
| --- | --- | --- |
| Ramp link | Ramp ID | Used to identify the links in the same group |
| | LINK_ID | Same as RMOB |
| | Position | Include Up main/Down main/Ramp |
| | Start offset | Calculated from nearby links and relative position to ramp |
| | End offset | Calculated from nearby links and relative position to ramp |
| | Link length | Calculated from topology |
| | Main link speed | Used to identify the map speed feature |
| | Main link map speed of downstream connecting link1 | Used to identify the map speed feature |
| | Pedestrian | |

The preprocessed mapping variables may be stored in the geographic database 123 for later use in a sign classification model. The preprocessing of act A110 may be performed at any point prior to act A120 and reception of the request, for example an hour, a day, a week, or longer. By moving the processing of this data ahead in time, the mapping system 121 and vehicle 124 are able to more quickly and efficiently handle and respond to incoming requests. The preprocessing not only frees up resources to process new requests in real time but also allows the mapping system 121 to speed up the real-time processing.

At act A120, the mapping system 121 receives a request for sensor data processing near the sensitive location for which certain data has been pre-processed in act A110. Different vehicles may transmit different types of messages including different data depending on the detected sign. In an embodiment, the data may include values for one or more sensor variables relating to the vehicle and the detected sign including: the value (speed), side (e.g., road side of signs as to the driving direction—left, right, overhead), heading (the heading of the traffic sign measured as the clock-wise degree between the traffic sign and due north), MM link (the map matched link associated with the request), and the lat/lon (e.g., location in latitude and longitude of the traffic sign). Values for the one or more sensor variables may be provided by a TSR application running locally on a vehicle 124. The TSR observations by the vehicle may be locally map-matched using a point-based map-matcher and a locally stored geographic database 123 on the vehicle. Map-matching is the process to find the nearest map link with the similar heading and the method. Different map matching processes may be used by the vehicle 124. An adjustment may be performed at the vehicle 124 or in the model as described below since the TSR observation locations are actually the vehicle's location at the time that they observed the sign, there is a longitudinal offset between the detected sign location and TSR observation location. When the actual traffic sign is placed at the link start, the TSR observations may not be map-matched on the correct link but rather on the upstream link. There are some adjustments accordingly to counter this effect. That is if the sign is too close to the downstream node of the link, the system map-matches the sign in the corresponding downstream link.

Figure 5:
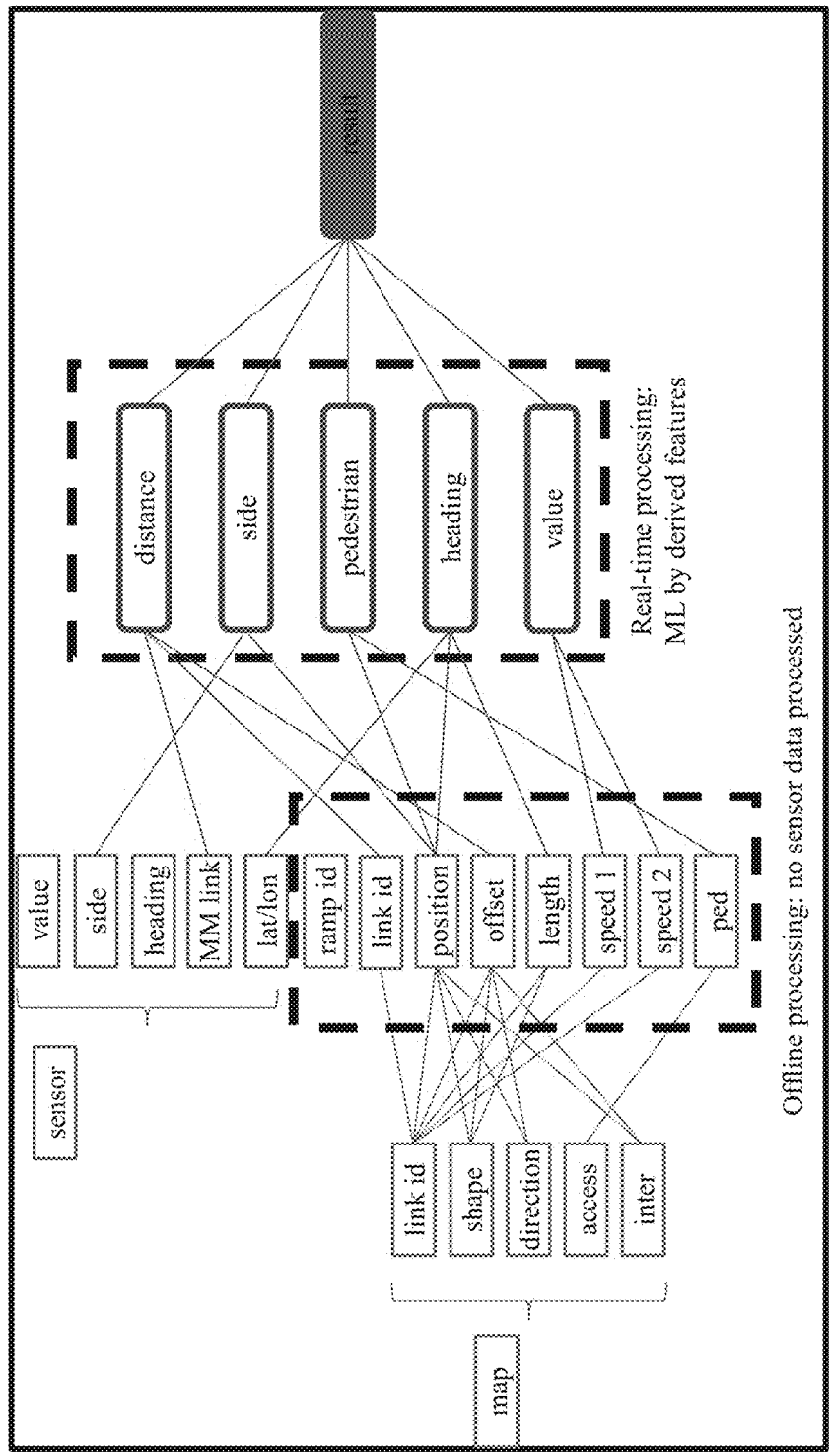
FIG. 5 depicts an example of offline and real-time processing of map and sensor data according to an embodiment.

At act A130, the mapping system 121 calculates one or more variables for the sensitive location using the one or more sensor variables and the one or more mapping variables. The sensor data and digital map data is fused together to generate values for one or more variables that are input into the model. FIG. 5 depicts an example of the offline (act A110) and real-time (act A130) processing of the map and sensor data for a ramp location described in FIG. 1. In an embodiment, the sensor values and previously calculated mapping values may be fused to calculate additional values that are then input into the model. Alternatively, the sensor values from the request may be input directly into the model which then combines the sensor values and previously calculated mapping values. In an embodiment, and as described in FIG. 5, the sensor variables may include the value (speed), side (e.g., road side of signs as to the driving direction—left, right, overhead), heading (the heading of the traffic sign measured as the clock-wise degree between the traffic sign and due north), MM link (the map matched link associated with the request), and the lat/lon (e.g., sign location in latitude and longitude of the traffic sign). As depicted, the map variables include the link id (the unique id for the link), shape (a set of shape locations for the links excluding start and end locations), direction (of travel), the access, and inter.

The offline processed values from Act A110 may include Ramp ID which is used to identify the links in the same group, the LINK_ID, Same as RMOB, the position including Up main/Down main/Ramp, the Start offset that is calculated from nearby links and relative position to ramp, the End offset that is calculated from nearby links and relative position to ramp, the Link length that is calculated from topology, the main link speed that is used to identify the map speed feature, the main link map speed of downstream connecting link1 that is used to identify the map speed feature, and pedestrian.

At act A140, the mapping system 121 inputs the values for the one or more real-time calculated variables into a model configured to output a classification for a location feature detected at the sensitive location. Classification as used herein, may imply a different meaning than typically used in image recognition where classification means giving an image a label. Here, classification may include determining which specific kind of sign is present (if any) and the location of the sign (e.g., to which link/node or what segment the sign applies to). In the ramp example, the classification step may return the type of sign (speed limit) the value (the posted speed limit), and which segment of the roadway it applies to (the off-ramp or the right lane of the highway). In an embodiment, the TSR running locally at the vehicle 124 detects the sign and value (speed limit) and the mapping system 121 verifies the location (which link it should be applied to). The model may be any type of model that is configured to classify/identify a sign given the derived feature data calculated at act A130. The model may be trained using machine learning techniques. The model may be, for example, a classifier network that is trained using supervised learning. The model may classify, based on the input derived features from the sensor and mapping data, a location of the detected sign. The model(s) may include a neural network that is defined as a plurality of sequential feature units or layers. Sequential is used to indicate the general flow of output feature values from one layer to input to a next layer. Sequential is used to indicate the general flow of output feature values from one layer to input to a next layer. The information from the next layer is fed to a next layer, and so on until the final output. The layers may only feed forward or may be bi-directional, including some feedback to a previous layer. The nodes of each layer or unit may connect with all or only a sub-set of nodes of a previous and/or subsequent layer or unit. Skip connections may be used, such as a layer outputting to the sequentially next layer as well as other layers. Rather than pre-programming the features and trying to relate the features to attributes, the deep architecture is defined to learn the features at different levels of abstraction based on the input data. The features are learned to reconstruct lower-level features (i.e., features at a more abstract or compressed level). Each node of the unit represents a feature. Different units are provided for learning different features. Various units or layers may be used, such as convolutional, pooling (e.g., max pooling), deconvolutional, fully connected, or other types of layers. Within a unit or layer, any number of nodes is provided. For example, 100 nodes are provided. Later or subsequent units may have more, fewer, or the same number of nodes.

Unsupervised learning may also be used to compute classification, based on the distribution of the samples, using methods such as k-nearest neighbor. In supervised learning, the classification step may happen in the last layer, and takes the key features of the sample as input from the previous layers. There are different classification functions, depending on the use case. An embodiment uses a Softmax function—where for each sample, the result is the probability distribution over the classes.

Alternative neural network configurations and workflows may be used for the network such as a convolution neural network (CNN), deep belief nets (DBN), or other deep networks. CNN learns feed-forward mapping functions while DBN learns a generative model of data. In addition, CNN uses shared weights for all local regions while DBN is a fully connected network (e.g., including different weights for all regions of a feature map. The training of CNN is entirely discriminative through backpropagation. DBN, on the other hand, employs the layer-wise unsupervised training (e.g., pre-training) followed by the discriminative refinement with backpropagation if necessary. In an embodiment, the arrangement of the trained network is a fully convolutional network (FCN). Alternative network arrangements may be used, for example, a 3D Very Deep Convolutional Networks (3D-VGGNet). VGGNet stacks many layer blocks containing narrow convolutional layers followed by max pooling layers. A 3D Deep Residual Networks (3D-ResNet) architecture may be used. A Resnet uses residual blocks and skip connections to learn residual mapping.

The training data for the model/network (and other networks) includes ground truth data or gold standard data, for example actual detected or identified signs. Ground truth data and gold standard data is data that includes correct or reasonably accurate labels that are verified manually or by some other accurate method. The training data may be acquired at any point prior to inputting the training data into the network. In an example operation, the model is configured as classifiers. The network inputs the training data (e.g., sensor data, features data, sensor and feature data, and/or derived data) and outputs a prediction or classification for the detected sign. The prediction is compared to the annotations from the training data. A loss function may be used to identify the errors from the comparison. The loss function serves as a measurement of how far the current set of predictions are from the corresponding true values. Some examples of loss functions that may be used include Mean-Squared-Error, Root-Mean-Squared-Error, and Cross-entropy loss. Mean Squared Error loss, or MSE for short, is calculated as the average of the squared differences between the predicted and actual values. Root-Mean Squared Error is similarly calculated as the average of the root squared differences between the predicted and actual values. For cross-entropy loss each predicted probability is compared to the actual class output value (0 or 1) and a score is calculated that penalizes the probability based on the distance from the expected value. The penalty may be logarithmic, offering a small score for small differences (0.1 or 0.2) and enormous score for a large difference (0.9 or 1.0). During training and over repeated iterations, the network attempts to minimize the loss function as the result of a lower error between the actual and the predicted values means the network has done a good job in learning. Different optimization algorithms may be used to minimize the loss function, such as, for example, gradient descent, Stochastic gradient descent, Batch gradient descent, Mini-Batch gradient descent, among others. The process of inputting, outputting, comparing, and adjusting is repeated for a predetermined number of iterations with the goal of minimizing the loss function. Once adjusted and trained, the model is configured to classify a detected sign in real time.

At act A150, the mapping system 121 provides the classification in response to the request. The classification may be used by the requesting entity (mobile device 122/ vehicle 124) to either perform an action or generate an instruction to perform and action.

Figure 6:
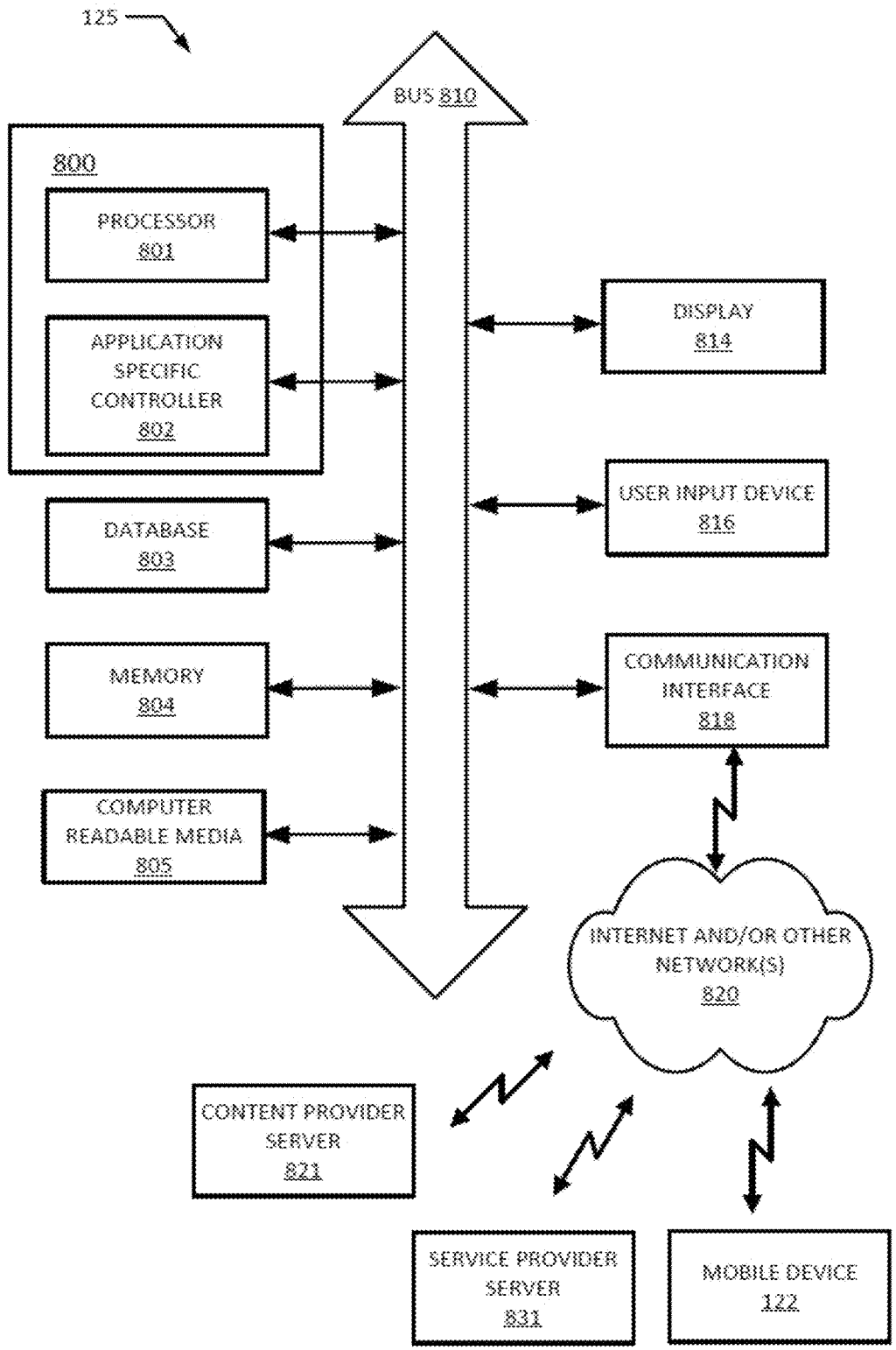
FIG. 6 depicts an example server of FIG. 3 according to an embodiment.

FIG. 6 illustrates an example server 125 for the system of FIG. 3 that is configured to fuse map and sensor data. The server 125 may include a bus 810 that facilitates communication between a controller that may be implemented by a processor 801 and/or an application specific controller 802, which may be referred to individually or collectively as controller 800, and one or more other components including a database 803, a memory 804, a computer readable medium 805, a display 814, a user input device 816, and a communication interface 818 connected to the internet and/or other networks 820. The contents of database 803 are described with respect to the geographic database 123. The server-side database 803 may be a master database that provides data in portions to a database of the mobile device 122. Additional, different, or fewer components may be included.

The server 125 is configured to compute one or more values for one or more variables based on digital map data and received sensor data. The server 125 may be in communication through the network 127/820 with a content provider server 821 and/or a service provider server 831. The server 125 may provide mapping data, for example sign data, to the content provider server 821 and/or the service provider server 831. The content provider may include device manufacturers that provide location-based services that users may access. The communication interface 818 may include a transceiver that configured to receive a request from a mobile device for sensor data processing near a location, the request including one or more sensor variables. The transceiver is also configured to transmit the classification to the mobile device.

The server 125 includes a controller 800 that is configured to calculate, prior to receiving the request, one or more mapping variables for the location using the digital mapping data, calculate one or more classification variables for the location using the one or more sensor variables and the one or more mapping variables, and input the one or more classification variables into a model configured to output a classification for a feature near the location;

The server 125 includes a memory/database 803 that is configured to store digital mapping data. The database 803 may be or may include a copy of the geographic database 123. The geographic database 123 is configured to store digital mapping data for locations and related signage data. The one or more devices 122 may collect data and transmit the data to the mapping system 121. The collected data may be stored with or cross checked with data stored in the geographic database 123. The geographic database 123 may include map data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the map data. The map data may include structured cartographic data or pedestrian routes. The map data may include map features that describe the attributes of the roads and intersections. The map features may include geometric features, restrictions for traveling the roads or intersections, roadway features, or other characteristics of the map that affects how vehicles 124 or mobile device 122 for through a geographic area. The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle. The geographic database 123 may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes. The geographic data may additionally or alternatively include other data records such as, for example, POI data records, topographical data records, cartographic data records, routing data, and maneuver data.

Figure 7:
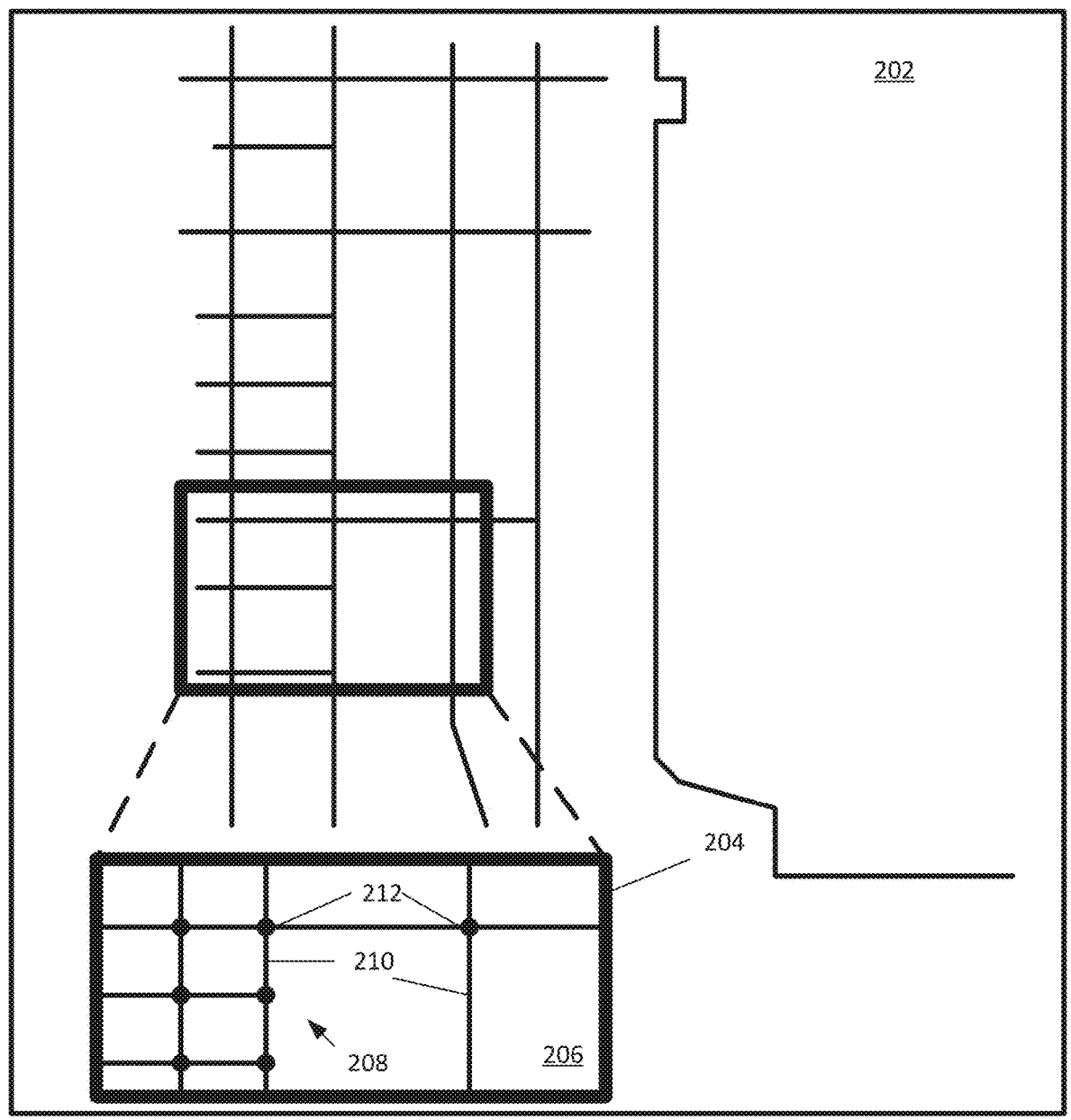
FIG. 7 depicts an example region of a geographic database.

FIG. 7 illustrates a map of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc. FIG. 7 further depicts an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Road segments 210 may also be referred to as links. Each road segment 210 is shown to have associated with it one or more nodes 212; one node represents the point at one end of the road segment and the other node represents the point at the other end of the road segment. The node 212 at either end of a road segment 210 may correspond to a location at which the road meets another road, i.e., an intersection, or where the road dead ends.

Figure 8:
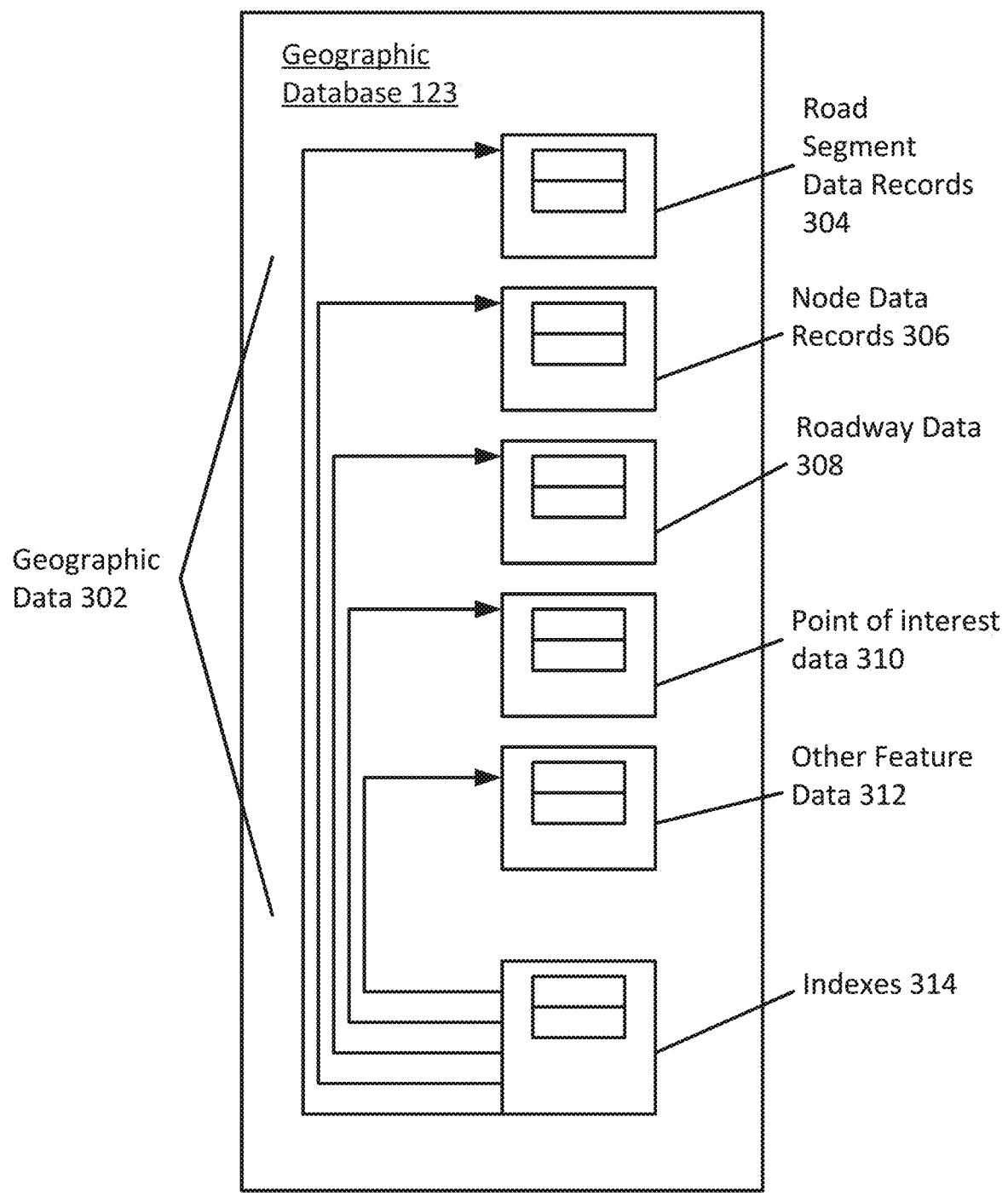
FIG. 8 depicts an example geographic database of FIG. 3 according to an embodiment.

As depicted in FIG. 8, in one embodiment, the geographic database 123 contains geographic data 302 that represents some of the geographic features in the geographic region 202 depicted in FIG. 8. The data 302 contained in the geographic database 123 may include data that represent the road network 208. In FIG. 8, the geographic database 123 that represents the geographic region 202 may contain at least one road segment database record 304 (also referred to as "entity" or "entry") for each road segment 210 in the geographic region 202. The geographic database 123 that represents the geographic region 202 may also include a node database record 306 (or "entity" or "entry") for each node 212 in the geographic region 202. The terms "nodes" and "segments" represent only one terminology for describing these physical geographic features, and other terminology for describing these features is intended to be encompassed within the scope of these concepts.

The geographic database 123 may at least store digital mapping data for the calculations and results thereof performed in Act A110. For example, for a ramp link, the digital mapping data may include, for example, the link id (the unique id for the link), shape (a set of shape locations for the links excluding start and end locations), direction (of travel), the access, and inter. For a different type of sensitive location, different types or attributes may be stored and/or determined.

The geographic database 123 may include feature data 308-312. The feature data 312 may represent types of geographic features. For example, the feature data may include roadway data 308 including signage data, lane data, traffic signal data, physical and painted features like dividers, lane divider markings, road edges, center of intersection, stop bars, overpasses, overhead bridges, etc. The roadway data 308 may be further stored in sub-indices that account for different types of roads or features. The complex driving data 310 may include data or sub-indices or layers for different types of scenarios. The feature data 312 may include other roadway features.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

Figure 9:
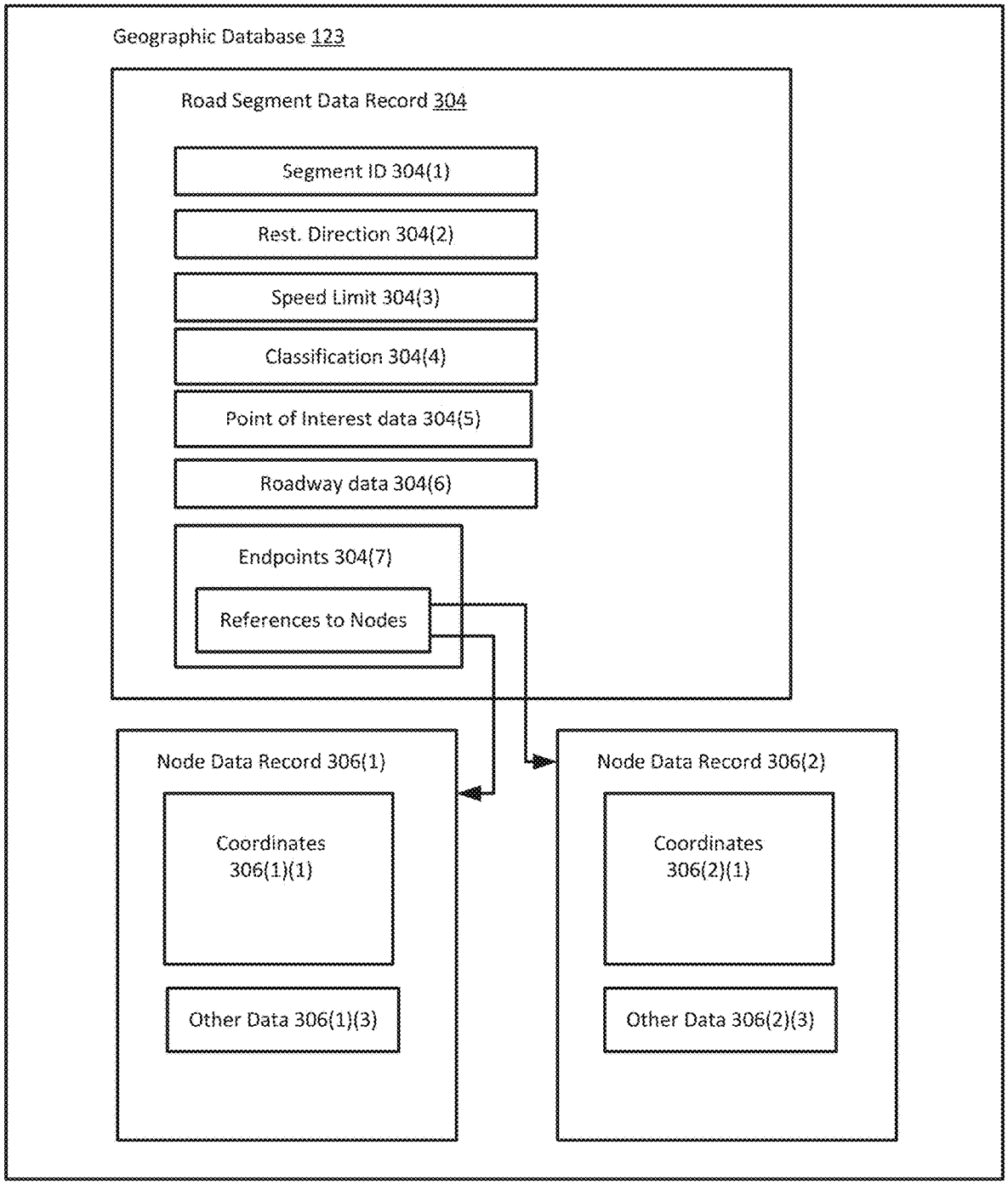
FIG. 9 depicts an example structure of the geographic database.

FIG. 9 shows some of the components of a road segment data record 304 contained in the geographic database 123 according to one embodiment. The road segment data record 304 may include a segment ID 304(1) by which the data record can be identified in the geographic database 123. Each road segment data record 304 may have associated information such as "attributes", "fields", etc. that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record 304 may include data 304(5) related to risk assessment that may be used to identify ethically complex scenarios. The road segment data record 304 may include data 304(6) that describes lane configurations. The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment. The road segment data record 304 may also include or be associated with other data 304(7) that refer to various other attributes of the represented road segment such as coordinate data for shape points, POIs, signage, other parts of the road segment, etc. The various attributes associated with a road segment may be included in a single road segment record, or may be included in more than one type of record which cross-references each other. For example, the road segment data record 304 may include data identifying what turn restrictions exist at each of the nodes which correspond to intersections at the ends of the road portion represented by the road segment, the name or names by which the represented road segment is known, the street address ranges along the represented road segment, and so on.

FIG. 9 also shows some of the components of a node data record 306 which may be contained in the geographic database 123. Each of the node data records 306 may have associated information (such as "attributes", "fields", etc.) that allows identification of the road segment(s) that connect to it and/or a geographic position (e.g., latitude and longitude coordinates). For the embodiment shown in FIG. 9, the node data records 306(1) and 306(2) include the latitude and longitude coordinates 306(1)(1) and 306(2)(1) for their node. The node data records 306(1) and 306(2) may also include other data 306(1)(3) and 306(2)(3) that refer to various other attributes of the nodes. The data in the geographic database 123 may be organized using a graph that specifies relationships between entities. A location graph is a graph that includes relationships between location objects in a variety of ways. Objects and their relationships may be described using a set of labels. Objects may be referred to as "nodes" of the location graph, where the nodes and relationships among nodes may have data attributes. The organization of the location graph may be defined by a data scheme that defines the structure of the data. The organization of the nodes and relationships may be stored in an ontology which defines a set of concepts where the focus is on the meaning and shared understanding. These descriptions permit mapping of concepts from one domain to another. The ontology is modeled in a formal knowledge representation language which supports inferencing and is readily available from both open-source and proprietary tools.

The memory 804 and/or the computer readable medium 805 may also include a set of instructions that can be executed to cause the server 125 to perform any one or more of the methods or computer-based functions disclosed herein. In a networked deployment, the system of FIG. 6 may alternatively operate or as a client user computer in a client-server user network environment, or as a peer computer system in a peer-to-peer (or distributed) network environment. It can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. While a single computer system is illustrated, the term "system" shall also be taken to include any collection of systems or sub-systems that individually or jointly execute a set, or multiple sets, of instructions to perform one or more computer functions.

Figure 10:
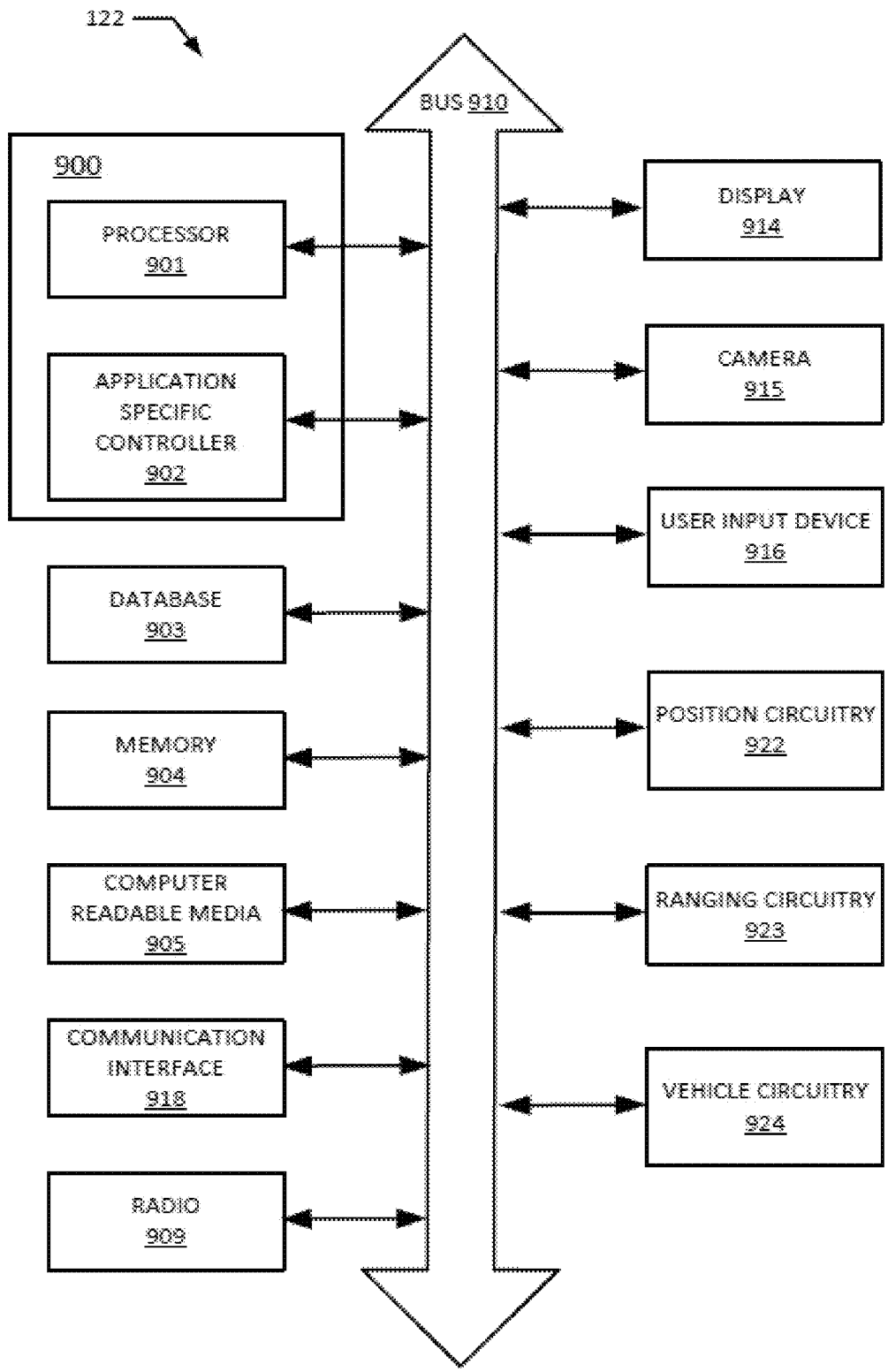
FIG. 10 depicts an example device of FIG. 3 according to an embodiment.

Referring back to FIG. 4, at act A150, the mapping system 121 provides the classification in response to the request. The classification may be used by the requesting entity (mobile device 122/vehicle 124) to either perform an action or generate an instruction to perform and action. FIG. 10 illustrates an example mobile device 122 for the system of FIG. 3 that is configured to generate TSR observation data, transmit a request to the mapping system 121, receive a result, and generate an instruction to perform a maneuver. The mobile device 122 may include a bus 910 that facilitates communication between a controller 900 that may be implemented by a processor 901 and/or an application specific controller 902, that may be referred to individually or collectively as controller 900, and one or more other components including a database 903, a memory 904, a computer readable medium 905, a communication interface 918, a radio 909, a display 914, a camera 915, a user input device 916, position circuitry 922, and ranging circuitry 923. The contents of the database 903 are described with respect to the geographic database 123. The device-side database 903 may be a user database that receives data in portions from the database 903 of the mobile device 122. The communication interface 918 connected to the internet and/or other networks (e.g., network 127 shown in FIG. 1). Additional, different, or fewer components may be included.

Figure 11:
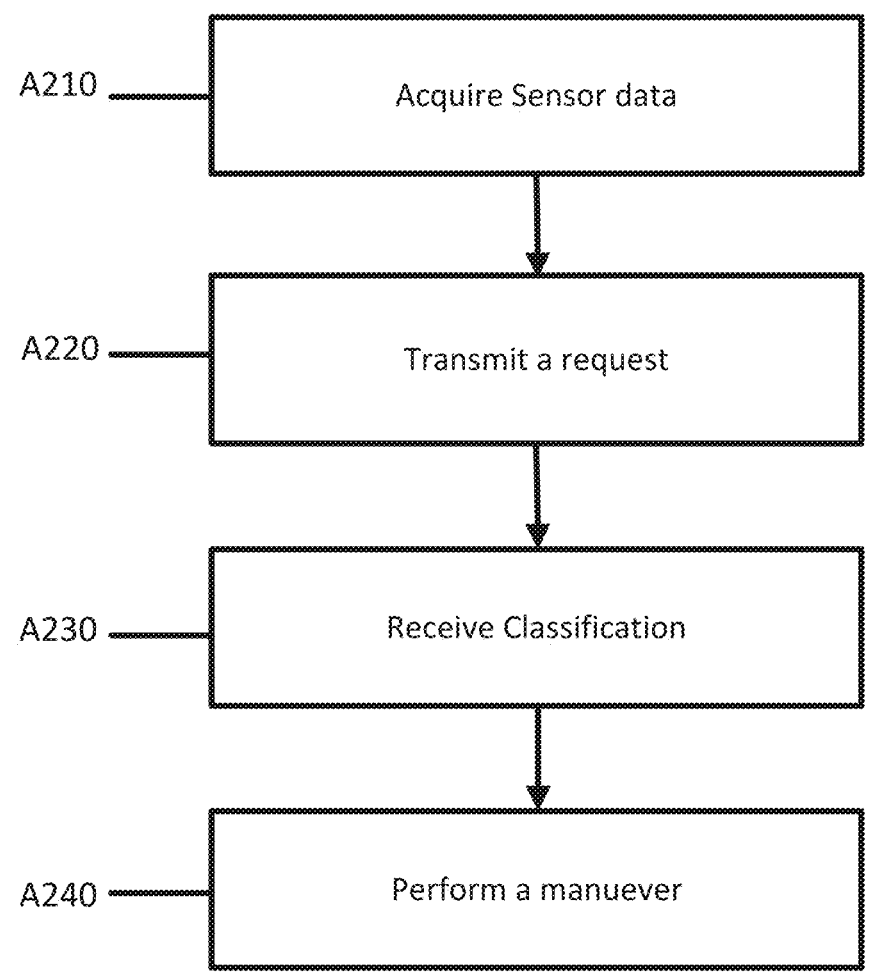
FIG. 11 depicts an example workflow for traffic sign recognition according to an embodiment.

FIG. 11 depicts an example workflow for implementing, by the device 122 of FIG. 10, one or more driving decisions generated by a vehicle 124. As presented in the following sections, the acts may be performed using any combination of the components indicated in FIG. 3, 6, or 10. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

At Act A210, the device transmits a request. The device 122 is configured to acquire data for use in sign classification. The device 122 is also configured to determine its position using the positioning circuitry 922, generate a report or request using the controller 900, and transmit the request to a mapping system 121 using the communication interface 918. The device 122 may also be configured to acquire and view data from a geographic database 123. In real-time, the device 122 may be embedded in a vehicle 124 and may be configured to acquire sensor data for a location, generate a request, and transmit the request to the mapping system 121. The device is configured to receive a response and generate an instruction for the vehicle 124 to perform an action.

The device 122 is configured to use the ranging circuitry 923 and/or camera and/or position circuitry 922 to acquire sensor data about an upcoming sign. The controller 900 is configured to implement a TSR system that detects upcoming traffic signs. The traffic signs may be detected using forward-facing cameras or ranging devices. A network may be trained to take in predefined and annotated traffic signs and learn using deep learning techniques described above. Once trained, the network may be used in real time to detect new traffic signs in real time. The output of the network may include values for one or more sensor variables that are then packaged and transmitted to the mapping system 121.

The controller 900 may also include a routing module including an application specific module or processor that calculates routing between an origin and destination. The routing module is an example means for generating a route. The display 914 is an example means for displaying the routing command. The mobile device 122 may generate a routing instruction based on the anonymized data. The routing instructions may be provided by the display 914. The mobile device 122 may be configured to execute routing algorithms to determine an optimum route to travel along a road network from an origin location to a destination location in a geographic region. Using input(s) including map matching values from the mapping system 121, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments. The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The radio 909 may be configured to radio frequency communication (e.g., generate, transit, and receive radio signals) for any of the wireless networks described herein including cellular networks, the family of protocols known as WIFI or IEEE 802.11, the family of protocols known as Bluetooth, or another protocol.

The memory 904 may be a volatile memory or a non-volatile memory. The memory 904 may include one or more of a read-only memory (ROM), random access memory (RAM), a flash memory, an electronic erasable program read only memory (EEPROM), or other type of memory. The memory 904 may be removable from the mobile device 122, such as a secure digital (SD) memory card.

The communication interface 918 may include any operable connection. An operable connection may be one in which signals, physical communications, and/or logical communications may be sent and/or received. An operable connection may include a physical interface, an electrical interface, and/or a data interface. The communication interface 818 and/or communication interface 918 provides for wireless and/or wired communications in any now known or later developed format.

The input device 916 may be one or more buttons, keypad, keyboard, mouse, stylus pen, trackball, rocker switch, touch pad, voice recognition circuit, or other device or component for inputting data to the mobile device 122. The input device 916 and display 914 be combined as a touch screen, which may be capacitive or resistive. The display 914 may be a liquid crystal display (LCD) panel, light emitting diode (LED) screen, thin film transistor screen, or another type of display. The output interface of the display 914 may also include audio capabilities, or speakers. In an embodiment, the input device 916 may involve a device having velocity detecting abilities.

The positioning circuitry 922 may include suitable sensing devices that measure the traveling distance, speed, direction, and so on, of the mobile device 122. The positioning system may also include a receiver and correlation chip to obtain a GPS signal. Alternatively, or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 922 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 922 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122. The position circuitry 922 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

The ranging circuitry 923 may include a LiDAR system, a RADAR system, a structured light camera system, SONAR, or any device configured to detect the range or distance to objects from the mobile device 122. The ranging circuitry may also include cameras at different angles and may be capable of maintaining a 360° view of its external environment. The device 122 may utilize 3D cameras for displaying highly detailed and realistic images. These image sensors automatically detect objects, classify them, and determine the distances between them and the device 122. For example, the cameras may identify other cars, pedestrians, cyclists, traffic signs and signals, road markings, bridges, and guardrails.

Referring back to FIGS. 11, at Act A220, the device receives a classification from the mapping system 121. The classification may include a determination of which link that the detected sign should be applied to. In the example of a ramp link described above, the classification may indicate whether a sign is to be applied to the ramp or a lane on the highway.

Figure 12:
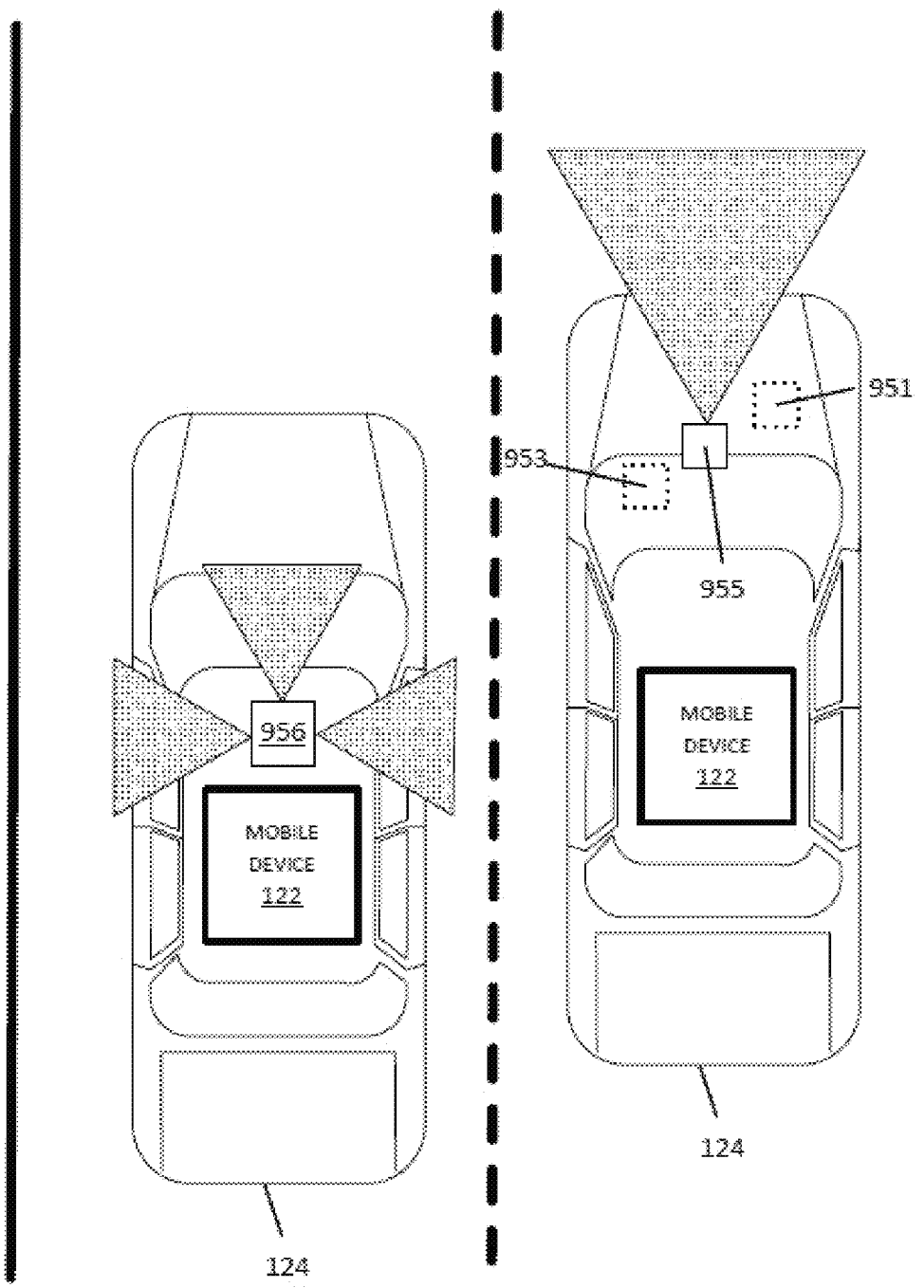
FIG. 12 depicts an example autonomous vehicle according to an embodiment.

At Act A230, the device generates an instruction to perform an action. The action may be performed, for example, by an autonomous vehicle 124. FIG. 12 illustrates exemplary autonomous vehicles 124 for providing location-based services or application using the systems and methods described herein as well as collecting data for such services or applications described herein. The autonomous vehicles 124 may include a variety of devices that collect position data as well as other related sensor data for the surroundings of the autonomous vehicle 124, here depicted as a car, but which use and configuration may be applied to bikesharing, scootersharing, or other autonomous vehicles 124. The position data may be generated by a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively, or additionally, the one or more detectors or sensors may include an accelerometer built or embedded into or within the interior of the vehicle 124. The vehicle 124 may include one or more distance data detection device or sensor, such as a LiDAR device. The distance data detection sensor may include a laser range finder that rotates a mirror directing a laser to the surroundings or vicinity of the collection vehicle on a roadway or another collection device on any type of pathway.

A connected vehicle includes a communication device and an environment sensor array for reporting the surroundings of the autonomous vehicle 124 to the mapping system 121. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and the mapping system 121. The network may be the Internet or connected to the internet.

The sensor array may include one or more sensors configured to detect surroundings of the autonomous vehicle 124. The sensor array may include multiple sensors. Example sensors include an optical distance system such as LiDAR 956, an image capture system 955 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera, or another camera.

In some alternatives, additional sensors may be included in the autonomous vehicle 124. An engine sensor 951 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 953, may include a steering wheel angle sensor, a speedometer sensor, or a tachometer sensor.

The device 122 may be integrated in the autonomous vehicle 124, which may include assisted driving vehicles such as autonomous vehicles 124, highly assisted driving (HAD), and advanced driving assistance systems (ADAS). Any of these assisted driving systems may be incorporated into mobile device 122. Alternatively, an assisted driving device may be included in the autonomous vehicle 124. The assisted driving device may include memory, a processor, and systems to communicate with the mobile device 122. The assisted driving vehicles may respond to the lane marking indicators (lane marking type, lane marking intensity, lane marking color, lane marking offset, lane marking width, or other characteristics) received from geographic database 123 and the mapping system 121 and driving commands or navigation commands. The device 122/vehicle 124 is configured to receive data from the mapping system 121 and perform an action such as adjusting the speed of a vehicle, making a turn, adjusting a lane position, changing lanes, etc.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in the specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory may be supplemented by, or incorporated in, special purpose logic circuitry.

To provide for interaction with a user, embodiments of the subject matter described in this specification may be implemented on a device having a display, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the subject matter described in this specification may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described in this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A method for advanced data fusion in a mapping system, the method comprising:
    calculating, offline by the mapping system, one or more mapping variables for a location on a roadway using digital map data stored in a geographic database, the one or more mapping variables including a ramp identifier, a link identifier, a position, a start offset, an end offset, a link length, a main link speed, and a main link map speed of a downstream connecting link;
    receiving, in real-time by the mapping system subsequent to calculating the one or more mapping variables, a request for sensor data processing of a traffic sign near the location from a vehicle, the request including one or more sensor variables comprising a value for the traffic sign, which side of the roadway the traffic sign is on, a heading of the traffic sign measured as a clock-wise degree between the traffic sign and due north, a map matched link associated with the request, a latitude value for the traffic sign, and a longitude value for the traffic sign;
    calculating, in real-time by the mapping system, one or more variables for the location using the one or more sensor variables and the one or more mapping variables, the one or more variables comprising a distance, a side of the roadway, pedestrian access, a heading, and a value for the traffic sign;
    inputting, in real-time by the mapping system, the one or more variables into a model configured to output a classification for the traffic sign near the location;
    providing, in real-time by the mapping system, the classification in response to the request; and
    performing, by the vehicle, an action in response to the classification, wherein the action comprises decreasing a speed of the vehicle.

2. The method of claim 1, wherein the location comprises at least a ramp segment.

3. The method of claim 1, further comprising:
    storing, prior to receiving the request, the one or more mapping variables in an index in the geographic database.

4. The method of claim 1, wherein the model comprises a machine learning model trained using a plurality of sensitive locations that affect autonomous driving applications.

5. The method of claim 1, wherein the sensor data is observation data from a traffic sign recognition application running on a device embedded in the vehicle.

6. The method of claim 5, wherein the sensor is configured to generate an instruction for the vehicle in response to being provided the classification.

7. The method of claim 1, wherein calculating, by the mapping system, the one or more mapping variables occurs at least a day prior to receiving, by the mapping system, the request.

8. A system for advanced data fusion, the system comprising:
    a transceiver configured to receive, in real-time, a request from a mobile device for sensor data processing near a location, the request including one or more sensor variables, the one or more sensor variables comprising a value for a traffic sign near the location, which side of a roadway the traffic sign is on, a heading of the traffic sign measured as a clock-wise degree between the traffic sign and due north, a map matched link associated with the request, a latitude value for the traffic sign, and a longitude value for the traffic sign;

a memory configured to store digital mapping data; and a processor configured to calculate, prior to receiving the request, one or more mapping variables for the location using the digital mapping data, wherein the one or more mapping variables include a ramp identifier, a link identifier, a position, a start offset, an end offset, a link length, a main link speed, and a main link map speed of a downstream connecting link, calculate, in real-time, classification variables for the location using the one or more sensor variables and the one or more mapping variables, the classification variables comprising a distance, a side of a roadway, pedestrian access, a heading, and a value for a feature near the location, and input the classification variables into a model configured to output, in real-time, a classification for the feature near the location;

wherein the transceiver is further configured to transmit the classification to the mobile device, wherein the mobile device is configured to instruct a vehicle to perform an action comprising decreasing a speed of the vehicle based on the classification, wherein the vehicle performs the action after receiving the instruction.

9. The system of claim 8, wherein the request comprises a request to identify or correct the feature comprising the traffic sign near a sensitive location that affects autonomous driving applications.

10. The system of claim 9, wherein the sensitive location comprises at least a ramp segment on a roadway.

11. The system of claim 8, wherein the classification comprises an identification of a road segment where the feature should be applied to.

12. The system of claim 8, wherein the model comprises a machine learning model trained using a plurality of sensitive locations that affect autonomous driving applications.

* * * * *